(12) United States Patent
Niazy

(10) Patent No.: US 6,206,998 B1
(45) Date of Patent: Mar. 27, 2001

(54) METHOD FOR MAKING FORMABLE LAMINATED DECORATIVE SHEETS

(75) Inventor: Richard R. Niazy, Clarkston, MI (US)

(73) Assignee: Android Industries of Michigan LLC, Whitmore Lake, MI (US)

( * ) Notice: Subject to any disclaimer, the term of this patent is extended or adjusted under 35 U.S.C. 154(b) by 0 days.

(21) Appl. No.: 09/019,760

(22) Filed: Feb. 6, 1998

Related U.S. Application Data

(60) Provisional application No. 60/039,319, filed on Feb. 7, 1997.

(51) Int. Cl.[7] .................................................. B29G 47/06
(52) U.S. Cl. .............. 156/243; 156/244.11; 156/244.19; 156/280; 156/289; 427/154
(58) Field of Search .......... 156/244.29, 244.27, 156/277, 278, 279, 280, 243, 244.11, 244.18, 244.19, 289; 427/146, 147, 152, 197, 384, 407.1, 412.1, 412.3, 256, 154

(56) References Cited

U.S. PATENT DOCUMENTS

| | | | |
|---|---|---|---|
| 3,620,872 | * | 11/1971 | Backwell ............................. 156/231 |
| 3,645,822 | * | 2/1972 | Widiger et al. ...................... 156/243 |
| 4,329,196 | * | 5/1982 | Rawlinson ........................... 156/243 |
| 4,330,352 | * | 5/1982 | Grimes et al. ....................... 156/235 |
| 4,423,106 | * | 12/1983 | Mahn .................................. 428/207 |
| 4,824,506 | * | 4/1989 | Hoerner et al. ..................... 156/245 |
| 4,913,760 | * | 4/1990 | Benson et al. ................... 156/244.11 |
| 5,286,528 | * | 2/1994 | Reafler .............................. 427/412.1 |
| 5,395,659 | * | 3/1995 | Graf et al. ......................... 427/407.1 |
| 5,538,576 | * | 7/1996 | Knop et al. ........................... 156/229 |

* cited by examiner

Primary Examiner—Michael W. Ball
Assistant Examiner—Gladys Piazza
(74) Attorney, Agent, or Firm—Rader, Fishman & Grauer PLLC

(57) ABSTRACT

A method of making thermoplastic formable sheets laminated with a decorative film, such as one or more layers of glossy clear coat bonded to a layer of pigment containing paint. The method involves providing a thermoplastic formable plastic sheet; applying, on a surface of the plastic sheet, a layer of unsolidified decorative colorant material which forms a decorative first film; curing (if necessary) the decorative material layer to form the adherent first film bonded to the sheet; and applying, on the first film, a unsolidified second film for forming a high quality outer surface covering the decorative first film. Optionally, the decorative sheet may have a first protective layer of thermoformable plastic film removably fixed to the decorative material to protect it from damage during forming of the sheet into a formed part or panel. For automotive body trim parts or body panels, the formable laminated sheet preferably has a thickness of from generally 0.065 to generally 0.3 inches and is preferably compression formed with optional thermoforming steps included with, or in place of, compression forming. A second removable protective layer of film may be applied over the first layer to protect against damage prior to compression forming of the sheet.

16 Claims, 3 Drawing Sheets

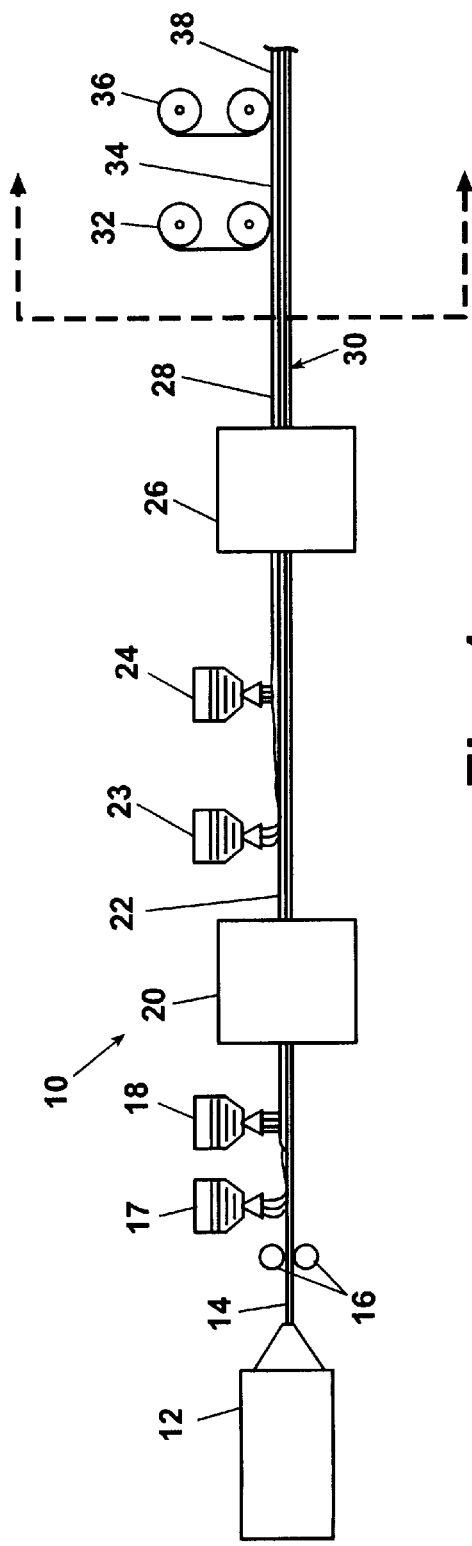
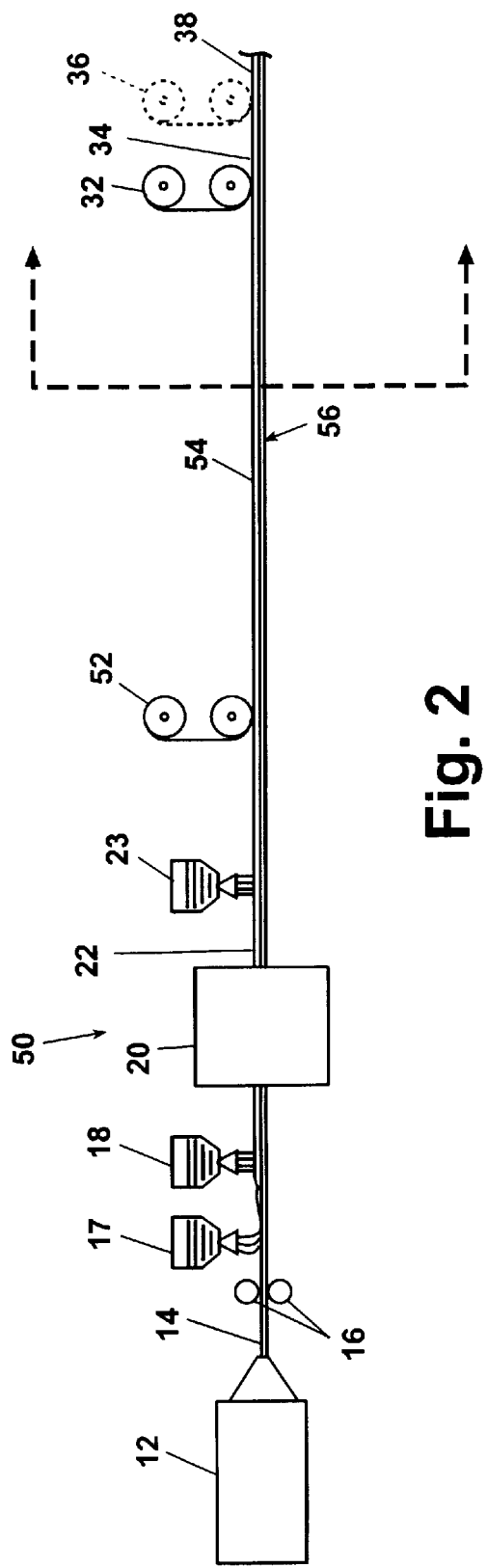

METHOD FOR MAKING FORMABLE LAMINATED DECORATIVE SHEETS

This application claims the benefit of U.S. Provisional Application No. 60/039,319, filed Feb. 7, 1997.

FIELD OF THE INVENTION

This invention relates to simplified methods for making thermoplastic formable plastic sheets joined with decorative colorants deposited thereon. This product is capable of being formed into body panels or trim components such as for automotive vehicle bodies as well as for other suitable purposes.

BACKGROUND OF THE INVENTION

Current practice in the manufacture of thermoplastic formable plastic sheets laminated with decorative films involves numerous steps. A film supplier first builds a paint film by providing a carrier layer of flexible but nonformable plastic film,. such as polyester, typically a "Mylar" 200A polyethylene terephthalate (PET). On the carrier layer, one or two coats of clear coat finish are formed on which a layer of color coat paint film is applied. The clear and color coats may be sprayed, calendared or otherwise applied.

Because the resulting multi-layer film is thin and difficult to handle, it is then laminated to a thin wall thermoplastic polyolefin (TPO) sheet, typically about 6–20 mils thick but thicknesses up to 60 mils can be used. The laminated product is then shipped to an extruder to have the thin wall sheet side of the product laminated to a thick wall TPO sheet about 0.065–0.300 inches thick. This may be accomplished as part of the extrusion process. In some cases, the nonformable carrier is removed prior to lamination by peeling it off the thin wall laminate, because if left thereon, it may interfere with the lamination process. The result is the desired thermoplastic formable laminated decorative sheet. In other cases, the carrier layer is left on the laminated sheet to protect the clear coat finish from damage in handling and is only removed prior to forming the decorative sheet into a final or intermediate molded product.

SUMMARY OF THE INVENTION

The present invention provides several improved and simpler methods for making decorative colored structural sheets that are formable at elevated temperatures into decorative structural and trim components, such as vehicle bodies or panels. In general, the invention is characterized by the steps of:

providing a thermoplastic formable plastic sheet;

applying, on a surface of said plastic sheet, an unsolidified colorant capable of serving as a decorative first film.

An additional optional step includes applying, on said first film, a second film of thermoformable clear coat bonded to said first film and forming a high quality outer surface covering the decorative first film.

The decorative first film may be composed of any form of unsolidified colorant such a dry powder or wet. The unsolidified film may be sprayed, calendared or otherwise applied. It may include a bonding agent which, upon curing of the unsolidified coating, causes the resulting dry film to adhere to the plastic panel.

The film (optional) of clear coat material may be applied in liquified or powdered form and cured as is the first film, or it may comprise a solidified dry film that is laminated onto the first film in the dry condition in accordance with known methods.

The depositing of decorative film and/or the second film may be continuous, non-continuous, depict indicia such as alphanumeric characters or pictures.

The formable plastic sheet is preferably made as a continuous extrusion, although any other form of processing may be utilized. The first and second films may be applied directly to the continuously extruded sheet, which is thereafter cut into desired lengths for processing or shipping. Alternatively, the extruded sheet may be cut into separate sheets and the films applied to the separated sheets to form the laminated decorative formable sheets of the invention.

If the decorative sheets are to be stored, shipped or handled extensively prior to placement in a forming apparatus for heating and forming into structural or trim components, it may be preferable to cover the laminated decorative surface with a protective layer of film to protect the surface against damage before forming. If a thermoformable protective layer is used, it may be left on the formed part to protect the finish until a later time, such as when the product is applied to a vehicle and even until the vehicle is delivered to an ultimate customer.

If the laminated sheet is to be compression formed, a second protective layer may be applied to protect the thermoformable first protective layer against damage prior to the forming operation as is disclosed in a copending commonly assigned patent application. This method prevents damage done to the first layer from penetrating into the decorative surface during the compression forming operation.

The disclosed method also contemplates an extruded colorant and an extruded second film.

These and other features and advantages of the invention will be more fully understood from the following description of certain exemplary embodiments of the invention taken together with the accompanying drawings.

BRIEF DESCRIPTION OF THE DRAWINGS

In the drawings:

FIG. 1 is a schematic diagram illustrating a first embodiment of the method of the invention;

FIG. 2 is a schematic diagram illustrating a second embodiment of the method of the invention.

DETAILED DESCRIPTION OF THE INVENTION

Figure 3:
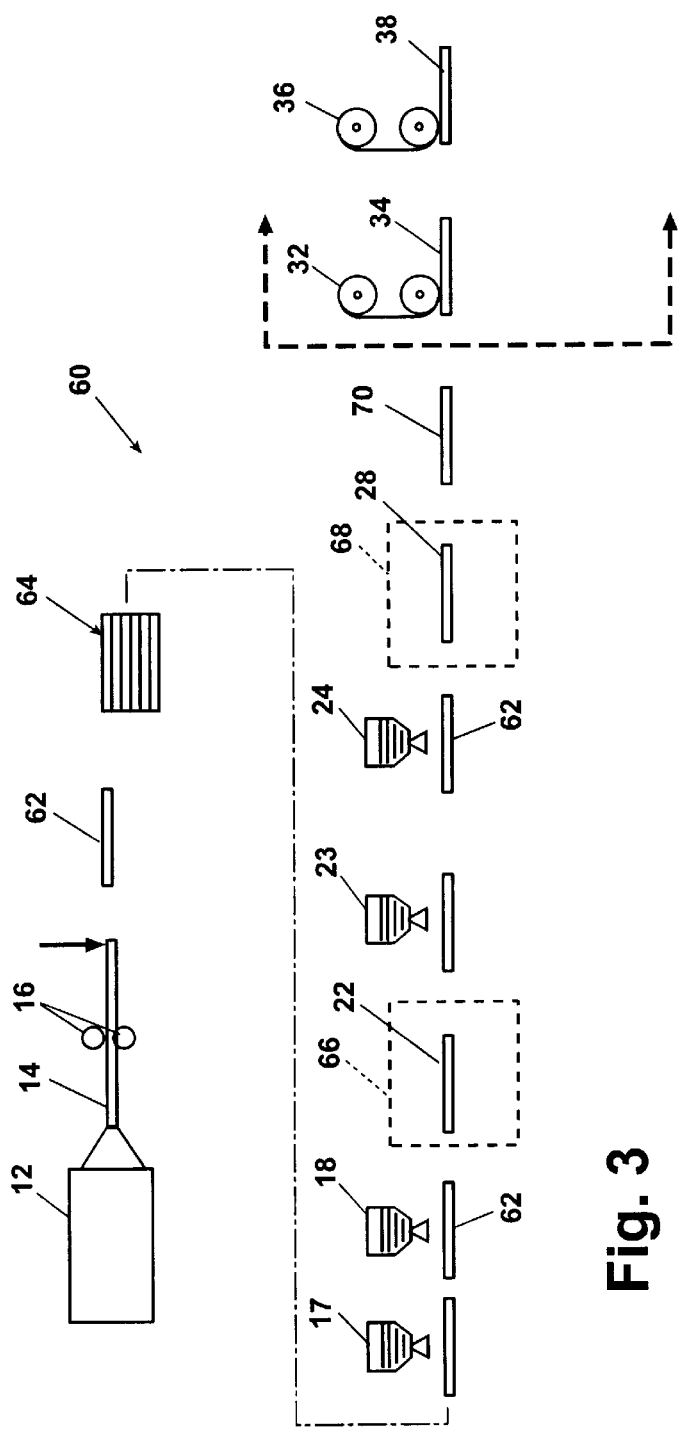
FIG. 3 is a schematic diagram illustrating a third embodiment of the method of the invention.

Referring now to the drawings in detail, FIG. 1 shows schematically manufacturing apparatus 10 carrying out a first embodiment of the method of the present invention. Apparatus 10 includes an extruder 12 forming a continuous layer of thermoplastic formable plastic sheet 14. The sheet 14 passes through rollers 16 which may guide and size the sheet if desired. Suitable conveyor means, not shown, would be provided for carrying the sheet 14 through further stations of the apparatus.

After extruding, sizing if required, and cooling as necessary, an optional step of applying an adhesive to sheet 14 is contemplated. Preferably, this step includes depositing an adhesive substance (preferably in unsolidified form) on one side of sheet 14. This optional adhesive deposition step is desirable in applications where substrate 14 does not bond well with the decorative colorant material 18 (discussed in the next step). In cases where decorative colorant material 18 bonds well with sheet 14, the adhesive deposition step 17 is unnecessary.

Figure 4:
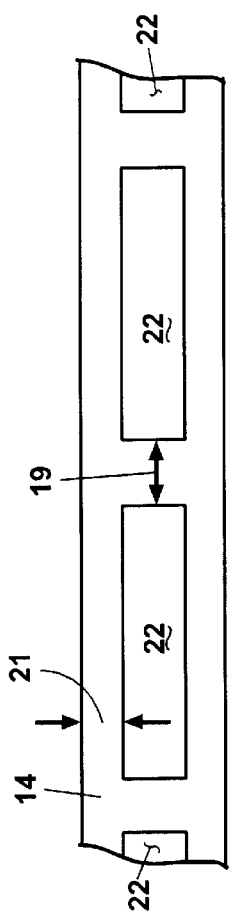
FIG. 4 is a partial top view of an extruded substrate having a pattern formed from a deposition of non-continuous decorative material.

Decorative colorant material, such as pigmented dry powder or liquified paint, is applied such as by spraying 18 onto one side of the sheet 14. The colorant could be applied by rolling, roll coating, roto-graviering, calendaring, ink jet printing or any other suitable deposition means. Optionally, the colorant may be mixed with a bonding agent capable of causing the colorant to adhere to the sheet 14 upon solidification. The bonding agent could be of any form including liquid or powder. The coating on sheet 14 is then solidified based on the nature of the materials used such as passing them through an oven 20 for curing to form a first decorative film 22 of colorant or the like adhering to the surface of sheet 14. Also, it is contemplated that the decorative colorant material can be deposited in several different patterns. For example, in addition to a continuous color layer, the decorative colorant material could be deposited in a non-continuous sequence with or without an interruption between the color layer and the edge of substrate 14 (see FIG. 4 for embodiment having non-continuous colorant portions 19 and interruptions 21 between color layer and edge of substrate).

The next step includes the application of graphics which is optional. This optional step includes using graphic application means 23 for depositing any manner of colorant (or colorants) in a manner which forms graphic indicia upon the surface of substrate 14. The formation of graphic indicia can include forming graphics thereon by way of rolling, roll coating, roto-graviering, calendaring, or ink jet printing. This graphic formation step not only contemplates traditional means of printed indicia such as alphanumeric characters and the like but also contemplates depositions encompassing scenes and pictures such as those capable of reproduction by way of ink jet printing.

Sprayer 24, or other suitable deposition means, applies an unsolidified clear coat material to the outer surface of the first decorative film. Clear coat material could be in either liquid or powder form. This coating is then cured by any suitable means compatible with the substrate and clear coat such as heating in a second oven 26. This forms a second coat film 28 over and adhering to the first film. The decorative layer, now laminated to the thermoplastic sheet 14, forms a thermoplastic decorative laminated sheet 30 which may be rolled or cut into separate sheets for shipping or further processing.

For automotive body trim parts or body panels, the formable laminated sheet is preferably thick walled, having a thickness of from generally 0.065 to generally 0.3 inches and is preferably compression formed with optional thermoforming steps included with, or in place of, compression forming. However, laminated sheets may also be provided with lesser thicknesses for forming to desired shapes and then applying, as by injection molding, to a thicker base material that provides the strength to form a body component. The thinner sheets may also be used for forming other products or components. Thus, the invention is not limited to sheets of any particular thickness or manner of use.

Optionally, the decorative surface of the laminated sheet 30 may be protected by laminating thereon, from rolls 32, a first protective layer 34 of plastic film, which may be a thermoformable film capable of being formed with the sheet in subsequent processing. This layer 34 protects the surface before, during and after forming, being removed when desired and as late as the time of delivery of the resulting product to a customer.

When compression forming is to follow, rolls 36 may be used to apply a second protective layer 38 of plastic film to protect the first layer from damage prior to forming. This second layer 38 is removed just before the compression forming operation, taking with it any marks or scratches which may have been made in the outer layer 38 in shipping or handling. The forming-process then takes place with an undamaged first layer 34 in place. This reduces the likelihood that the underlying decorative films 22, 28 will evidence surface disruptions.

Referring now to FIG. 2, there is shown schematically apparatus 50 carrying out a second embodiment of the method of the present invention. Apparatus 50, as in the first embodiment, includes an extruder 12 generating a sheet 14, rolls 16, adhesive depositing means 17 (optional), applying means such as sprayer 18 for applying colorant, curing means (if any) 20, and graphics applying means 23 (optional). These operate in the same manner as in FIG. 1 to form a first decorative film 22 adhering to the sheet 14. At a subsequent station, rolls 52 laminate a dry clear coat layer 54 to the outer surface of the decorative film 22 to form a two coat decorative plastic sheet 56 essentially like the sheet 30 formed from the embodiment of FIG. 1. Optionally, rolls 32 and 36, or other suitable means, may be used to apply removable first and second protective layers 34, 38 as in FIG. 1.

FIG. 3 shows schematically apparatus 60 carrying out a third embodiment of the method of the present invention. Apparatus 60 includes an extruder 12 for continuous sheet 14 and rolls 16 operating as in the previously described embodiments. Thereafter, the sheet 14 is trimmed to desired lengths to form individual thermoplastic formable sheets 62. These are stacked 64 and transported, if necessary, to a station or location for further processing. Trimming to individual sheets is optional for thin wall sheets, which may instead be shipped in roll form; but trimming may be required where thicker sheets are used in which forming into rolls may not be practical.

In subsequent processing steps, adhesive is applied 17 (optional) and sprayer 18, or other deposition means applies decorative colorant material, such as paint, to an individual sheet 62. The first layer is cured at 66 to form a first decorative film 22. Graphic images are formed 23 (optional) and a sprayer 24 or other means then applies a clear coat on the first layer and this is cured at 68, forming a second clear coat film 28. The resulting decorative laminated formable sheet 70 may then be formed into a structural or trim component or panel as desired.

Optionally, the sheet 70 may have its decorative surface protected by first and second protective layers 34, 38 applied, for example, as films from rolls 32, 36.

Figure 5:
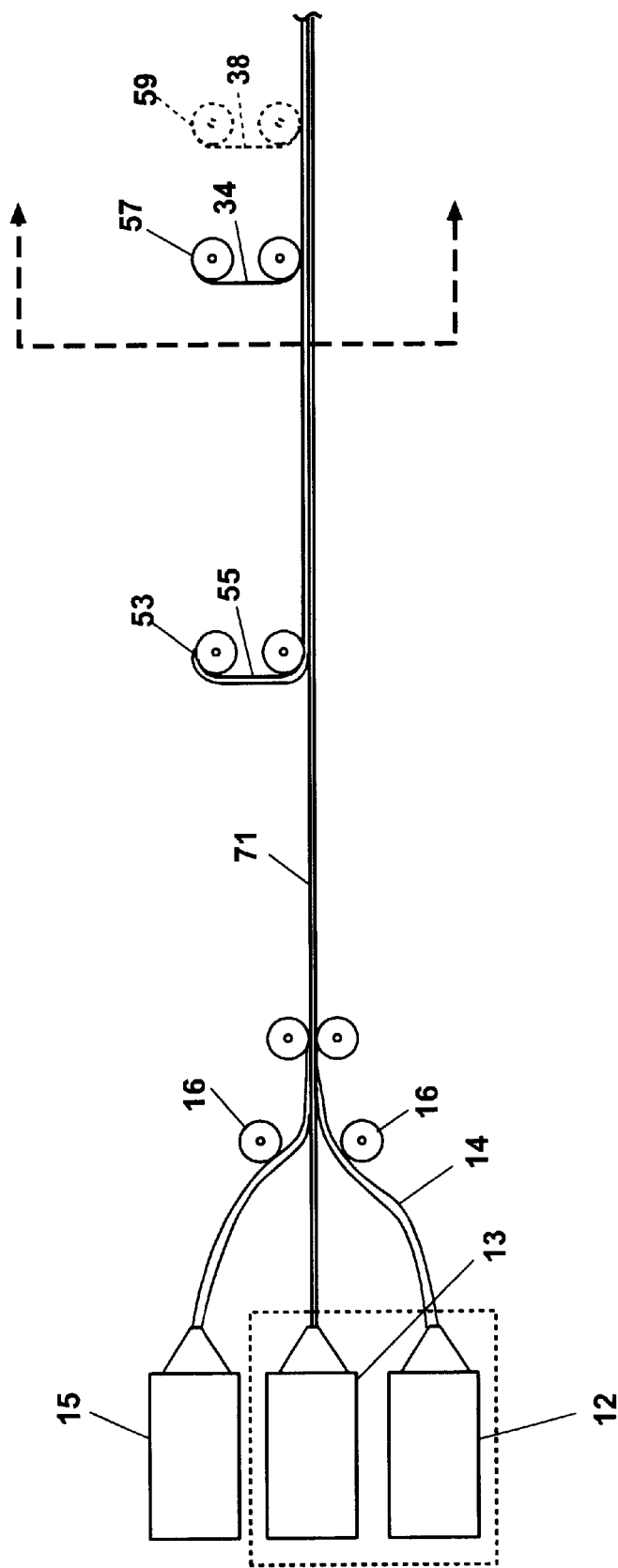
FIG. 5 is a schematic diagram illustrating a fourth embodiment of the method of the present invention.

Now referring to FIG. 5, a fourth embodiment of the present invention is disclosed which differs from embodiments 1–3 in that clear coat 15 and color coat 13 are not deposited as in an unsolidified state onto substrate 14, but rather they are formed as an extrusion and all three extrusions 13, 14 and 15 are joined together thereby forming a unified sheet 71. Optionally, rolls 53 are used to laminate dry clear coat layer 55 to the outer surface of sheet 71. One or more rollers 57, 59 may be used to apply removable first and second protective layers 34, 38 in the same manner that has been discussed in conjunction with FIGS. 1 and 2. There is no reason that color extrusion 13 must be separate from substrate extrusion 12 and there may be distinct cost advantages if the colorant is mixed with the substrate prior to extruding. Accordingly, if substrate 12 can be colored to achieve the appropriate coloration, color extrusion 13 can be completely eliminated thereby integrating the color extrusion 13 step with the substrate extrusion 12 step. In embodiment 4 shown in FIG. 5, each extrusion 12, 13 and 15 is shown being extruded simultaneously with the other extrusions. This is not the only approach that can be used for extruding these three layers. For example, it is possible to extrude, cool, and store the substrate in a roll, extrude, cool, and store the color extrusion in a roll, and extrude, cool and store the clear extrusion in a roll. Thereafter, each of the extrusion layers can be simultaneously removed from their respective rolls, preheated, and then processed through pinch rollers 16 to form sheet 71.

While the invention has been described by reference to various specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A method of making thermoplastic decorative laminated sheets that are formable into decorative components or panels, said method characterized by the steps of:
   A) providing a thermoplastic formable plastic sheet;
   B) applying, directly on a surface of said thermoplastic formable plastic sheet, an unsolidified colorant material capable of forming a decorative first film;
   C) applying, on said decorative first film, a second film of thermoformable clear coat forming a high quality surface covering said decorative first film;
   D) applying on said second film of thermoformable clear coat a first protective layer of thermoformable plastic film removably fixed to the second film of thermoformable clear coat; and
   E) applying on said first protective layer of thermoformable plastic film a second protective layer of plastic film removably fixed to the first protective layer of thermoformable plastic film for protection of the first protective layer of thermoformable plastic film during handling.

2. A method as in claim 1 characterized in that said unsolidified colorant material is selected from the set of liquified pigmented paint and dry powder pigment.

3. A method as in claim 1 characterized in that said second film of thermoformable clear coat is applied as a dry clear coat film.

4. A method as in claim 1 characterized in that said second film of thermoformable clear coat is applied by the steps of:
   applying on said decorative first film a layer of curable liquid clear coat material; and
   curing said layer of curable liquid clear coat material.

5. A method as in claim 1 further comprising:
   extruding said thermoplastic formable plastic sheet to form a continuous layer, and
   segmenting the continuous layer of said thermoplastic formable plastic sheet following steps B and C.

6. A method as in claim 1, wherein after step B but before step C, the following step is conducted:
   solidifying the unsolidified colorant material.

7. A method as in claim 6, wherein said solidifying step further includes curing.

8. A method as in claim 1, wherein step B further includes applying said unsolidified colorant material without interruptions.

9. A method as in claim 1, wherein step B further includes applying said unsolidified colorant material with interruptions.

10. A method as in claim 1, further including the step of applying an adhesive to said thermoplastic formable plastic sheet prior to step B.

11. A method as in claim 1, further including the step of applying graphic indicia to said thermoplastic formable plastic sheet.

12. A method of making thermoplastic laminated sheet, comprising the steps of:
   A) extruding a first thermoplastic formable plastic sheet,
   B) extruding a second thermoplastic formable sheet,
   C) bonding permanently the first and second extruded thermoplastic plastic sheets with one another thereby forming a decorative laminated sheet; and
   D) applying at least two protective layers of thermoformable plastic to said decorative laminated sheet of step C, the at least two protective layers of thermoformable plastic being removably fixed to said decorative laminated sheet.

13. The method as in claim 12, wherein said bonding step is achieved, at least in part by utilizing the temperature characteristics of at least one of the first and second thermoplastic plastic sheets.

14. The method as in claim 12, further including the step of extruding a generally clear third thermoplastic sheet and bonding it to at least one of the first and second thermoplastic sheets.

15. The method of claim 12 further including extruding a colorized plastic sheet and placing it between the first and second thermoplastic sheets, said colorized plastic sheet thereby, at least in part, bonding together the first and second thermoplastic plastic sheets.

16. The method of claim 12, wherein the first thermoplastic formable plastic sheet of step A includes a colorant, and the second thermoplastic formable sheet of step B is a clear coat.

* * * * *